United States Patent Office 3,414,639
Patented Dec. 3, 1968

---

3,414,639
DIARYL ALKYLENEDIPHENOL PHOSPHATES
James J. Hodan, Williamsville, William L. Schall, Buffalo, and Arlen W. Frank, Grand Island, N.Y., assignors to Hooker Chemical Corporation, Niagara Falls, N.Y., a corporation of New York
No Drawing. Filed May 27, 1965, Ser. No. 459,431
8 Claims. (Cl. 260—953)

This invention relates to the preparation of mixed organic phosphates. More particularly, it relates to diaryl alkylenediphenol phosphates.

It is an object of this invention to prepare a mixed phosphate of the type described which possesses unusual plasticizing properties. Other objects of the invention will be apparent from the following detailed description.

In accordance with the practice of this invention it has been found that the objects of this invention can be attained by transesterifying a triaryl phosphate with a dihydric aryl compound, in the presence of an effective amount of a strong basic catalyst for the reaction, collecting up to a 1 molar proportion of evolved phenolic compound, and recovering the desired reaction product.

The mixed phosphates of this invention have the formula

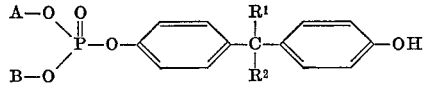

wherein $R^1$ and $R^2$ are independently selected from the group consisting of hydrogen, alkyl having from 1 to 9 carbon atoms, preferably from 1 to 6 carbon atoms, the most preferred of these having from 1 to 3 carbon atoms, and aryl having from 6 to 8 carbon atoms, the most preferred of these being phenyl, A and B are radicals independently characterized by the following structure

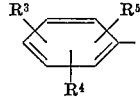

wherein $R^3$, $R^4$ and $R^5$ are independently selected from the group consisting of hydrogen, alkyl having from 1 to 18 carbon atoms, preferably from 1 to 12 carbon atoms, the most preferred of these having from 1 to 9 carbon atoms, and α-alkyl benzyl, said alkyl having from 1 to 12 carbon atoms, preferably from 1 to 8 carbon atoms, the most preferred of these having 1 to 4 carbon atoms.

Typical examples of the mixed phosphates of this invention include, among others, the following: diphenyl 4-(4'-hydroxybenzyl) phenyl phosphate, diphenyl 4-(4'-hydroxy-α,α-dimethylbenzyl) phenyl phosphate, diphenyl 4-(4'-hydroxy-α-methylbenzyl) phenyl phosphate, dinonylphenyl 4-(4'-hydroxybenzyl) phenyl phosphate, dioctylphenyl 4-(4'-hydroxy-α,α-dimethylbenzyl) phenyl phosphate, dicresyl 4-(4'-hydroxybenzyl) phenyl phosphate, dixylyl 4-(4'-hydroxy-α,α-dimethylbenzyl) phenyl phosphate, O-biphenylyl phenyl 4-(4'-hydroxy-α,α-dimethylbenzyl) phenyl phosphate, O-biphenylyl nonylphenyl 4-(4'-hydroxybenzyl) phenyl phosphate, and the like.

The triaryl phosphates which may be employed to prepare the compounds of this invention have the formula

wherein A and B are as previously defined, and C is selected from the group consisting of A and B. Typical examples of these include triphenyl phosphate, tri-p-cresyl phosphate, tri-2,6-xylyl phosphate, trihexylphenyl phosphate, trioctylphenyl phosphate, trinonylphenyl phosphate, tridecylphenyl phosphate, tridodecylphenyl phosphate, O-biphenylyl diphenyl phosphate, tris(α-methyl benzylphenyl) phosphate, tris[2,4,6-tri(α-methylbenzyl) phenyl] phosphate, phenyl bis(α-methylbenzylphenyl) phosphate, phenyl bis 2,4-di(α-methylbenzyl) phenyl phosphate, diphenyl α-methylbenzylphenyl phosphate, diphenyl 2,4,6-tri(α-methylbenzyl) phenyl phosphate, and the like, the preferred being a phosphate having at least one phenyl substituent.

The dihydric phenols which may be used to prepare the compounds of this invention have the formula

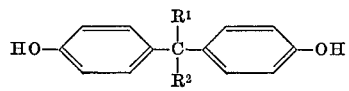

wherein $R^1$ and $R^2$ are independently selected from the group previously defined. Typical examples of these include 4,4'-sec-butylidenediphenol, 4,4'-methylenediphenol (Bisphenol F), 2,4-methylenediphenol, 2,2'-methylenediphenol, 2,4-ethylidene diphenol, 4,4'-isopropylidene diphenol (Bisphenol A), 2,2'-isopropylidene diphenol, 2,4-isopropylidene diphenol, 4,4'-(3-pentylidene) diphenol, 4,4' or 2,2' or 2,4-(2-hexylidene) diphenol, 4,4' or 2,2' or 2,4'-(3-heptylidene) diphenol, 4,4' or 2,2' or 2,4-(1,1,1-trichloro-2-ethylidene) diphenol, 4,4' or 2,2' or 2,4'-benzylidene diphenol, 4,4' or 2,2' or 2,4'-propylidene diphenol, and the like.

As the basic catalysts for the reaction there may be used strong bases such as alkali metals, alkali metal hydrides, hydroxides, phenoxides and alkoxides, and alkaline earth metals and their compounds which are sufficiently strong bases. Typical examples are sodium, sodium hydride, sodium hydroxide, sodium methoxide, sodium ethoxide, sodium phenoxide, sodium diphenyl phosphite, sodium dibutyl phosphite, sodium phosphate, lithium, potassium hydroxide, barium hydroxide, and the like.

Sufficient catalyst is introduced to the reaction to provide about 0.001 part to 0.5 part of catalyst per part of phosphorus in the phosphorus-containing compound. It is preferred to provide about 0.005 part to 0.25 part, and most preferred to provide 0.01 part to 0.1 part of catalyst, on the basis previously mentioned.

The reaction mixture may be heated and maintained at a temperature in the range of 60 degrees centigrade to 300 degrees centigrade, the preferred range being from 100 degrees centigrade to 300 degrees centigrade. It is most preferred to maintain the temperature above the boiling point of the hereinafter described phenolic by-product, but below the boiling point of the reactants and the desired reaction product. These temperatures range from 150 degrees centigrade to 250 degrees centigrade.

Generally, the reaction is carried out at sub-atmospheric pressure. However, it is also within the scope of this invention to employ atmospheric or super-atmospheric pressures.

The triaryl phosphate and dihydric phenol are employed in the reaction zone in substantially stoichiometric proportions, that is, about 1 molar proportion of triaryl phosphate per molar proportion of dihydric phenol.

The reaction mixture of transesterifying dihydric phenol, triaryl phosphate and catalyst may be prepared in any suitable means adapted for batch operation. As the reaction proceeds, the dihydric phenol transesterifies and displaces an aryl radical from the triaryl phosphate as a phenolic by-product compound which generally has a boiling point lower than that of the reactants and desired reaction product, and, accordingly, may be volatilized continuously from the reaction mixture and withdrawn from the mixture as formed. Suitable means adapted to remove the phenolic by-product may include a vessel equipped with a fractionating column or vacuum means and suitable receiver, and the like. The extent of the reaction may be determined by collecting and measuring the amount of phenolic by-product formed.

The reaction is controlled, so that, when a 1 molar proportion of phenolic by-product is evolved and collected, by means as previously described, the reaction is stopped by suitable means, which include cooling. The reaction may be interrupted at any earlier time, if such is desirable.

Alternatively, if the desired reaction product has a boiling point which is lower than that of the reactants and phenolic by-product, the desired reaction product may be volatilized continuously from the reaction mixture and withdrawn from the mixture until a 1 molar proportion is recovered.

As previously mentioned, the products of this invention are useful as plasticizers in materials, such as synthetic rubber compositions, polyvinyl chloride, copolymers of vinyl chloride with other vinyl monomers, and the like. Additionally, the products are useful as chemical intermediates in the production of compounds, such as synthetic resins and plastics.

In order to further illustrate the invention, but without being limited thereto or restricted thereby, the following examples are given wherein, unless otherwise indicated, all parts and percentages are given on a weight basis, and all temperatures are given in degrees centigrade.

Example 1.—Preparation of diphenyl 4-(4'-hydroxy-α,α-dimethylbenzyl) phenyl phosphate A reaction vessel equipped with a heating mantle, mechanical stirrer, short column, thermometer and receiver was charged with 326 parts of triphenyl phosphate and 228 parts of Bisphenol A (4,4'-isoproplidene diphenol). The charge was heated to 60 degrees centigrade and 1 part of sodium catalyst was added. Vacuum was applied to the system and the reaction temperature raised to 180 degrees centigrade. The phenol was stripped off as it was formed until 94 parts were recovered. The system was then cooled under nitrogen. The product was very thick and had a yellow color. To remove the color the product was dissolved in trichloroethylene, treated with clay and filtered through maglite (light magnesium oxide). The product contained 6.71 percent of phosphorus. The calculated percentage of this element in $C_{27}H_{25}O_5P$ is 6.74 percent phosphorus. Infrared analysis indicated the absence of more than 5 percent free Bisphenol A and, in addition, it showed a strong band for OH at 3360μ.

Example 2.—Preparation of diphenyl 4-(4'-hydroxybenzyl) phenyl phosphate

The vessel of Example 1 was charged with 326.28 parts of triphenyl phosphate and 200 parts of 4,4'-methylene diphenol (Bisphenol F). The charge was heated to 80 degrees centigrade to product a slurry; to this was added 1 part of sodium catalyst. Immediately, vacuum was applied and the temperature raised to 125–130 degrees centigrade, forcing phenol to evolve at 15 millimeters of mercury absolute pressure. The stripping of the phenol was continued until 94 parts were recovered. The residual product was treated to remove the color, as described in Example 1. The product contained 7.58 percent of phosphorus. The calculated percentage of this element in $C_{25}H_{21}O_5P$ is 7.18 percent phosphorus.

Example 3.—Preparation of phenyl α-methylbenzylphenyl 4-(4'-hydroxy-α,α-dimethylbenzyl) phenyl phosphate A reaction vessel, as described in Example 1, was charged with 129 parts diphenyl α-methylbenzylphenyl phosphate and 68.4 parts 4,4'-isopropylidene diphenol (Bisphenol A). The charge was heated to 125 degrees centigrade to effect a solution. The solution was cooled to 60 degrees centigrade and 1 part of sodium catalyst added. Thereafter, vacuum was applied and the temperature raised to and maintained at 140 degrees centigrade, forcing phenol to evolve at 20 millimeters of mercury absolute pressure. The stripping of the phenol was continued until 28.2 parts were recovered. The residual product was treated to remove the color, as described in Example 1. The product contained 5.51 percent of phosphorus. The calculated percentage of this element in $C_{35}H_{33}O_5P$ is 5.46 percent phosphorus.

Example 4.—Preparation of dicresyl 4-(4'-hydroxybenzyl) phenyl phosphate

A reaction vessel, as described in Example 1, was charged with 368 parts of tricresyl phosphate and 200 parts of 4,4'-methylidene diphenol (Bisphenol F). The charge was heated to 60 degrees centigrade and 1 part of sodium catalyst was added. Vacuum was immediately applied and the temperature raised to 135 degrees centigrade, forcing cresol to evolve at 10–15 millimeters of mercury absolute pressure. Stripping of the cresol was continued until 108 parts were recovered. The residual product was treated to remove the color, as described in Example 1. The product contained 6.78 percent of phosphorus. The calculated percentage of this element in $C_{27}H_{25}O_5P$ is 6.74 percent phosphorus.

When a compound, such as diphenyl 4-(4'-hydroxy-α,α-dimethylbenzyl) phenyl phosphate, diphenyl 4-(4'-hydroxybenzyl) phenyl, phenyl-α-methylbenzylphenyl 4-(4'-hydroxy-α,α-dimethylbenzyl) phenyl phosphate or dicresyl 4-(4'-hydroxybenzyl) phenol phosphate, prepared in accordance with the above examples, is added in effective amounts to a plastic or elastomeric composition, such as polyvinyl chloride, it provides flexibility, extensibility, and impact resistance previously lacking in the composition.

What is claimed is:

1. A compound having the formula

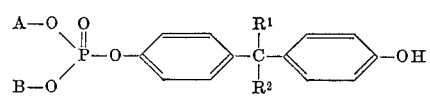

wherein $R^1$ and $R^2$ are independently selected from the group consisting of hydrogen, alkyl and aryl, and A and B are radicals independently selected from the following structure

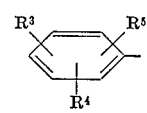

wherein $R^3$, $R^4$ and $R^5$ are independently selected from the group consisting of hydrogen, alkyl and α-alkyl benzyl.

2. A compound in accordance with claim 1 wherein $R^3$, $R^4$ and $R^5$ are hydrogen.

3. A compound in accordance with claim 2 wherein $R^1$ is hydrogen and $R^2$ is alkyl.

4.

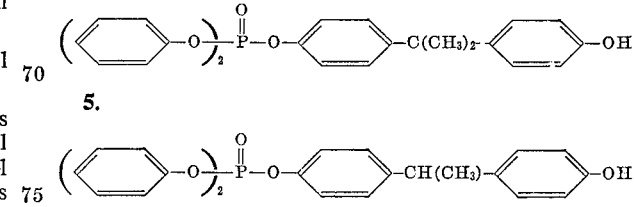

5.

6.
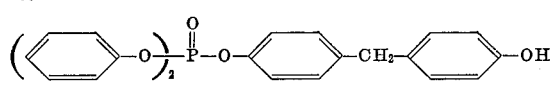
8.
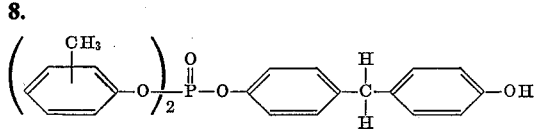
7.
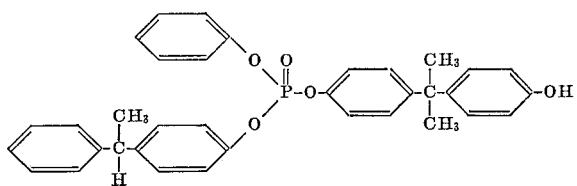
References Cited
UNITED STATES PATENTS
2,728,790  12/1955  Sroog _____ 260—982
3,297,361  1/1967  Brown et al.
3,245,949  4/1966  Murdock.
CHARLES B. PARKER, *Primary Examiner.*
A. H. SUTTO, *Assistant Examiner.*